United States Patent [19]

Cherpeck

[11] Patent Number: 5,399,178
[45] Date of Patent: Mar. 21, 1995

[54] MANNICH CONDENSATION PRODUCTS OF POLYALKYLENE HYDROXYAROMATIC ESTERS AND FUEL COMPOSITIONS CONTAINING THE SAME

[75] Inventor: Richard E. Cherpeck, Cotati, Calif.

[73] Assignee: Chevron Chemical Company, San Francisco, Calif.

[21] Appl. No.: 169,683

[22] Filed: Dec. 17, 1993

[51] Int. Cl.$^6$ ............................................. C10L 1/18
[52] U.S. Cl. ............................. 44/415; 252/51.5 R; 560/42
[58] Field of Search ................ 44/415; 560/42, 67; 252/51.5 R

[56] References Cited

U.S. PATENT DOCUMENTS

| | | | |
|---|---|---|---|
| 3,285,855 | 11/1966 | Dexter et al. | 252/57 |
| 3,849,085 | 11/1974 | Kreuz et al. | 44/78 |
| 4,134,846 | 1/1979 | Machleder et al. | 252/51.5 |
| 4,231,759 | 11/1980 | Udelhofen et al. | 44/75 |
| 4,276,431 | 6/1981 | Schnegg et al. | 560/67 |
| 4,320,021 | 3/1982 | Lange | 252/51.5 R |
| 4,347,148 | 8/1982 | Davis | 252/51.5 R |
| 4,859,210 | 8/1989 | Franz et al. | 44/53 |
| 5,059,347 | 10/1991 | Mollet et al. | 252/400.62 |
| 5,196,142 | 3/1993 | Mollet et al. | 252/311 |

*Primary Examiner*—Prince Willis, Jr.
*Assistant Examiner*—Cephia D. Toomer
*Attorney, Agent, or Firm*—L. S. Squires; W. K. Turner

[57] ABSTRACT

Mannich condensation products prepared by the condensation of a compound having the formula:

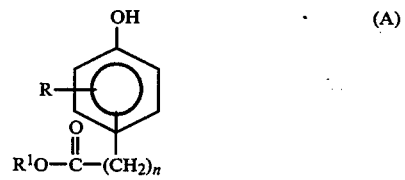

wherein R is hydrogen, lower alkyl having 1 through 6 carbon atoms, hydroxy or lower alkoxy having 1 through 6 atoms; $R^1$ is polyalkyl having an average molecular weight of about from 400 to 5000 and n is 0 or a whole integer of from 1 through 10 with ammonia, alkylamine, or polyamine and an aldehyde.

The condensation products and their fuel-soluble salts are useful as fuel additives for the prevention and control of engine deposits.

72 Claims, No Drawings

MANNICH CONDENSATION PRODUCTS OF POLYALKYLENE HYDROXYAROMATIC ESTERS AND FUEL COMPOSITIONS CONTAINING THE SAME

BACKGROUND OF THE INVENTION

Field of the Invention

This invention relates to Mannich condensation products of certain hydroxyaromatic esters. In a further aspect, this invention relates to the use of such compounds in fuel compositions to prevent and control engine deposits.

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted phenols are known to reduce engine deposits when used in fuel compositions. U.S. Pat. No. 3,849,085, issued Nov. 19, 1974 to Kreuz et al., discloses a motor fuel composition comprising a mixture of hydrocarbons in the gasoline boiling range containing about 0.01 to 0.25 volume percent of a high molecular weight aliphatic hydrocarbon-substituted phenol in which the aliphatic hydrocarbon radical has an average molecular weight in the range of about 500 to 3500. This patent teaches that gasoline compositions containing minor amounts of an aliphatic hydrocarbon-substituted phenol not only prevent or inhibit the formation of intake valve and port deposits in a gasoline engine, but also enhance the performance of the fuel composition in engines designed to operate at higher operating temperatures with a minimum of decomposition and deposit formation in the manifold of the engine.

Similarly, U.S. Pat. No. 4,134,846, issued Jan. 16, 1979 to Machleder et al., discloses a fuel additive composition comprising a mixture of (1) the reaction product of an aliphatic hydrocarbon-substituted phenol, epichlorohydrin and a primary or secondary mono- or polyamine, and (2) a polyalkylene phenol. This patent teaches that such compositions show excellent carburetor, induction system and combustion chamber detergency and, in addition, provide effective rust inhibition when used in hydrocarbon fuels at low concentrations.

Amino phenols are also known to function as detergents/dispersants, antioxidants and anti-corrosion agents when used in fuel compositions. U.S. Pat. No. 4,320,021, issued Mar. 16, 1982 to R. M. Lange, for example, discloses amino phenols having at least one substantially saturated hydrocarbon-based substituent of at least 30 carbon atoms. The amino phenols of this patent are taught to impart useful and desirable properties to oil-based lubricants and normally liquid fuels.

Nitro phenols have also been employed as fuel additives. For example, U.S. Pat. No. 4,347,148, issued Aug. 31, 1982 to K. E. Davis, discloses nitro phenols containing at least one aliphatic substituent having at least about 40 carbon atoms. The nitro phenols of this patent are taught to be useful as detergents, dispersants, antioxidants and demulsifiers for lubricating oil and fuel compositions.

In addition, U.S. Pat. No. 4,231,759, issued Nov. 4, 1980 to Udelhofen et al., discloses a fuel additive composition comprising the Mannich condensation product of (1) a high molecular weight alkyl-substituted hydroxyaromatic compound wherein the alkyl group has a number average molecular weight of about 600 to about 3000, (2) an amine and (3) an aldehyde. This patent teaches that such Mannich condensation products provide carburetor cleanliness when employed alone, and intake valve cleanliness when employed in combination with a hydrocarbon carrier fluid.

U.S. Pat. No. 4,859,210, issued Aug. 22, 1989 to Franz et al., discloses fuel compositions containing (1) one or more polybutyl or polyisobutyl alcohols wherein the polybutyl or polyisobutyl group has a number average molecular weight of 324 to 3000, or (2) a poly(alkoxylate) of the polybutyl or polyisobutyl alcohol, or (3) a carboxylate ester of the polybutyl or polyisobutyl alcohol. This patent further teaches that when the fuel composition contains an ester of a polybutyl or polyisobutyl alcohol, the ester-forming acid group may be derived from saturated or unsaturated, aliphatic or aromatic, acyclic or cyclic mono- or polycarboxylic acids.

U.S. Pat. No. 3,285,855, issued Nov. 15, 1966 to Dexter et al., discloses alkyl esters of dialkyl hydroxybenzoic and hydroxyphenylalkanoic acids wherein the ester moiety contains from 6 to 30 carbon atoms. This patent teaches that such esters are useful for stabilizing polypropylene and other organic material normally subject to oxidative deterioration. Similar alkyl esters containing hindered dialkyl hydroxyphenyl groups are disclosed in U.S. Pat. No. 5,196,565, which issued Mar. 23, 1993 to Ross.

U.S. Pat. No. 5,196,142, issued Mar. 23, 1993 to Mollet et al., discloses alkyl esters of hydroxyphenyl carboxylic acids wherein the ester moiety may contain up to 23 carbon atoms. This patent teaches that such compounds are useful as antioxidants for stabilizing emulsion-polymerized polymers.

My prior co-pending commonly assigned U.S. application Ser. No. 08/144,980, filed Oct. 28, 1993, hereby incorporated by reference in its entirety discloses certain polyalkyl hydroxyaromatic esters which provide excellent control of engine deposits, especially intake valve deposits, when employed as fuel additives in fuel compositions. These polyalkyl hydroxyaromatic esters have been found to produce fewer combustion chamber deposits than known aliphatic hydrocarbon-substituted phenolic fuel additives.

SUMMARY OF THE INVENTION

It has now been discovered that certain Mannich condensation products of the compounds described in my prior application also provide excellent control of engine deposit, including intake valve deposits, with fewer combustion chamber deposit when employed as fuel additives, and further provide excellent control of combustion chamber injector deposits. More specifically the compounds of the present invention are Mannich condensation products prepared by the reaction of a polyalkylene aromatic ester of the formula:

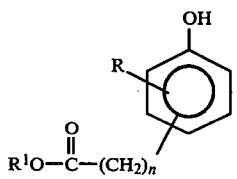

(A)

wherein

R is hydrogen, lower alkyl having 1 through 6 carbon atoms, hydroxy or lower alkoxy having 1 through 6 carbon atoms;

$R^1$ is a polyalkyl group having an average molecular weight of about from 400 to 5000; and n is 0 or a whole integer of from i through 10 with ammonia, lower alkylamine having 1 to 6 carbon atoms, polyamine having 2 to about 12 amine nitrogen atoms and 2 to about 40 carbon atoms and a carbon atom to amine nitrogen atom ratio from 1:1 to about 10:1 or mixtures thereof, and an aldehyde having the formula $HR^2C(O)$ wherein $R^2$ is hydrogen or lower alkyl having the formula 1 through 6 carbon atoms. Fuel soluble salts of these products can be made by conventional procedures e.g. reaction with the appropriate acid. As is frequently the case with Mannich condensation products the product is a mixture of products because of competing or sequential reactions result in secondary or derivative products for example in cross linked products. (The starting material of formula A is also typically a mixture of compounds with respect to the polyaklyl substituent and corresponding the product is also a mixture of products having different polyalkyl substituents).

The amine moiety of the Mannich condensation product is preferably derived from a polyamine having from 2 to about 12 amine nitrogen atoms and from 2 to about 40 carbon atoms. The polyamine preferably has a carbon-to-nitrogen ratio of from about 1:1 to about 10:1. The polyamine may be substituted with substituents selected from hydrogen, hydrocarbyl groups of from 1 to about 10 carbon atoms, acyl groups of from 2 to about 10 carbon atoms, and monoketone, monohydroxy, mononitro, monocyano, alkyl and alkoxy derivatives of hydrocarbyl groups of from 1 to 10 carbon atoms. It is preferable that at least one of the basic nitrogen atoms of the polyamine is a primary or secondary amino nitrogen. The polyamine component employed in the present invention has been described and exemplified more fully in U.S. Pat. No. 4,191,537.

The base product and in general the principal product can be represented by the formula:

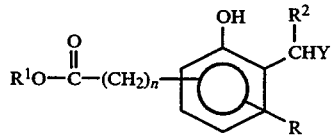

(I)

wherein

R is hydrogen, lower alkyl having 1 through 6 carbon atoms, hydroxy or lower alkoxy having 1 through 6 atoms;

$R^1$ is a polyalkyl group having an average molecular weight in the range of about from 400 to 5000;

n is 0 or a whole integer of from 1 through 10;

$R^2$ is hydrogen or lower alkyl having 1 through 6 carbon atoms;

Y is amino, lower alkylamino having 1 through 6 carbon atoms or a polyamine radical, preferably a polyalkylene amine, having 2 through 12 amine nitrogen atoms and 2 through 40 carbon atoms, with the proviso that attachment of Y to the methylene linking group, i.e., —$CH(R^2)$ Y is via one of its amine nitrogen atoms and the further proviso that the $$\begin{array}{c} R^2 \\ | \\ -CHY \end{array}$$

substituent is ortho to a hydroxy group on the benzene ring and wherein the remaining substituents may be at any available position on the benzene ring.

In general, the commercial product will be a mixture of compounds according to formula I because as noted above the reaction product will be a mixture of products and also because the polyalkyl ester starting material is generally a mixture because commercial sources of polyalkylene are generally mixtures. In general, there is no commercial reason to isolate individual compounds. If desired the individual compounds of formula I could be prepared by using individual compounds as starting material and by isolating individual compounds from the product. But, as noted above, there is in general no commercial reason to isolate particular compounds when the product is used as a fuel additive and in general would not be economical.

The present invention further provides a fuel composition comprising a major amount of hydrocarbons boiling in the gasoline or diesel range and an effective deposit-controlling amount of a compound or mixture of compounds of the present invention.

The present invention additionally provides a fuel concentrate comprising an inert stable oleophilic organic solvent boiling in the range of from about 150° F. to 400° F. and from about 10 to 70 wt. % of a compound or mixture of compounds of the present invention.

The invention further provides a method of controlling engine deposits via the use of fuels containing a deposit control effective amount of a compound or mixture of compounds of the present invention.

The invention further provides a method for preparing the aforedescribed compositions.

FURTHER DESCRIPTION OF THE INVENTION AND PREFERRED EMBODIMENTS

As noted above, because of competing or secondary reactions the Mannich condensation product of the present invention is typically a mixture of compounds. For example, where a long chain polyalkylene polyamine reactant is used, although the principal attachment of the polyamine radical to the benzyl ring will occur at the terminal nitrogen atoms attachment can also occur at an internal amino nitrogen atom. Further because of competing secondary reactions cross-linked products are also produced. Thus, for example, in the case of diethylene triamine a significant amount of the bis product will also be producted, e.g.:

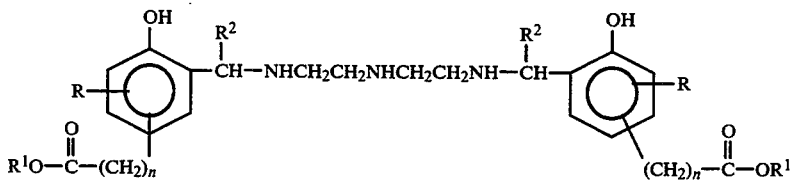

wherein R, $R^1$ and $R^{2'}$ and n are as defined hereinabove,

The polyamine reactant used in the present invention is preferably an acyclic polyamine having terminal amino nitrogen atoms or less preferably a nitrogen heterocycle. In each case the amino nitrogen atoms are separated from each other by at least two carbon atoms. As noted above the polyamine preferably has a carbon-to-nitrogen ratio of from about 1:1 to about 10:1. The polyamine may be substituted with substituents selected from hydrogen, hydrocarbyl groups of from 1 to about 10 carbon atoms, acyl grounds of from 2 to about 10 carbon atoms, and monoketone, monohydroxy, monomononitro, monocyano, alkyl and alkoxy derivatives of hydrocarbyl groups of about from 1 to 10 carbon atoms. It is preferable that at least one of the basic nitrogen atoms of the polyamine is a primary or secondary amino nitrogen. The polyamine component employed in the present invention has been described and exemplified more fully in U.S. Pat. No. 4,191,537.

Hydrocarbyl, as used above, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyalkylene amines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxy-isopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, diethyleneoxymethyl, triethyleneoxyethyl, tetraethyleneoxyethyl, diethyleneoxyhexyl, etc. The aforementioned acyl groups are such as propionyl, acetyl, etc. The more preferred substituents are hydrogen, $C_1$-$C_6$ alkyls and $C_1$-$C_6$ hydroxyalkyls.

In the substituted polyalkylene amine, the substituents are found at any atom capable of receiving them. The substituted atoms, e.g., substituted nitrogen atoms, are generally geometrically inequivalent, and consequently the substituted amines finding use in the present invention can be mixtures of mono- and poly-substituted polyamines with substituent groups situated at equivalent and/or inequivalent atoms.

Although as noted above a wide range of substituted and unsubstituted polyamines can be used, resulting in the corresponding Mannich condensation product, in general polyalkylene polyamines, including alkylene diamine, and including substituted polyalkyleneamines, e.g., alkyl and hydroxyalkyl-substituted polyalkylene polyamine are preferred. Preferably, the alkyl group linking the amino nitrogen groups contains from 2 to 6 carbon atoms, there being preferably from 2 to 3 carbon atoms between the nitrogen atoms. Such groups are exemplified by ethylene, 1,2-propylene, 2,2-dimethylpropylene, trimethylene, 1,3,2-hydroxypropylene, etc. Examples of the polyalkylene amines from which such radicals are derived include ethylene diamine, diethylene triamine, di(trimethylene) triamine, dipropylene triamine, triethylene tetraamine, tripropylene tetraamine, tetraethylene pentamine, and pentaethylene hexamine. Such amines encompass isomers such as branched-chain polyamines and previously mentioned substituted polyamines, including hydroxy- and hydrocarbyl-substituted polyamines. Among the polyalkylene polyamines, those containing 2–12 amino nitrogen atoms and 2–24 carbon atoms are especially preferred, and the $C_2$–$C_3$ alkylene polyamines are most preferred, that is, ethylene diamine, polyethylene polyamine, propylene diamine and polypropylene polyamine, and in particular, the lower polyalkylene polyamines, e.g., ethylene diamine, dipropylene triamine, etc. A particularly preferred polyalkylene polyamine is diethylene triamine.

The amine component of the presently employed fuel additive also may be derived from heterocyclic polyamines, heterocyclic substituted amines and substituted heterocyclic compounds, wherein the heterocycle comprises one or more 5–6 membered rings containing oxygen and/or nitrogen. Such heterocyclic rings may be saturated or unsaturated and substituted with groups selected from the aforementioned substituents. The heterocyclic compounds are exemplified by piperazines, such as 2-methylpiperazine, N-(2-hydroxyethyl)-piperazine, 1,2-bis-(N-piperazinyl)ethane and N,N'-bis(N-piperazinyl)piperazine, 2-methyl-imidazoline, 3-amino-piperidine, 3-aminopyridine, N-(3-aminopropyl)-morpholine, etc. Among the heterocyclic compounds, the piperazines are preferred.

In terms of deposit control performance and/or manufacturing ease or blending facility, the preferred Mannich condensation products are, referring to the substituents identified in formula I, and the corresponding fuel-soluble salts thereof, are those having at least one of the following preferred substituents and more preferably two or more. Preferably, R is hydrogen, hydroxy, or lower alkyl having 1 to 4 carbon atoms. More preferably, R is hydrogen or hydroxy. Most preferably, R is hydrogen.

Preferably, $R^1$ is a polyalkyl group having an average molecular weight in the range of about 400 to 5000, more preferably about 500 to 3000, and most preferably about 600 to 2000. Preferably, n is 0, 1 or 2 and more preferably 0. Preferably, $R^2$ is hydrogen. Preferably, Y is a radical derived from an unsubstituted polyalkylene polyamine, more preferably polyethylene polyamines or polypropylene polyamines.

Again referring to the substituents identified in formula I, a preferred group of compounds of the inventor are those wherein R is hydrogen, hydroxy, or lower alkyl having 1 to 4 carbon atoms; n is 0 and Y is ethylene diamine or diethylene triamine radical.

Another preferred group of compounds are those wherein R is hydrogen, hydroxy, or lower alkyl having 1 to 4 carbon atoms; and n is i or 2 and Y is a polyethylene polyamine. A still more preferred group of compounds are those wherein R is hydrogen or hydroxy; $R_2$ is hydrogen; n is 0; and Y is ethylene diamine or diethylene triamine radicals.

It is further preferred that the aromatic ring hydroxyl substituent(s) of the compounds of formula I are in a meta or para position relative to the polyalkyl ester moiety (i.e., —$(CH_2)_n$—$C(O)$—$OR^1$).

Preferably, the compounds of the present invention will have a sufficient molecular weight so as to be nonvolatile at normal engine intake valve operating temperatures (about 200°–250° C.). Typically, the average molecular weight of the primary or base reaction product, i.e., the compounds of formula I, will range from about 550 to about 6000. More preferably, the compound and salts have an average molecular weight of about from 600 to 4000, more preferably from 700 to 3000. Generally average molecular weight will primarily be a function of the $R^1$ polyalkyl substituent but can also be influenced by the chain length of the polyamine substituent. The molecular weight of the product mixture will also be affected by cross-linking. Thus, the primary considerations are volatility and fuel solubility and not the technical molecular weight of the product mixture.

Fuel soluble salts of the Mannich condensation products are also useful for preventing or controlling engine deposits and in some case may improve solubility. Suitable salts include, for example, those obtained by protonating the amino moiety with an acid or deprotonating the phenol moiety with a base. Preferred salts are derived from toluenesulfonic acid and methanesulfonic acid or alkali metals and substituted ammonium salts.

DEFINITIONS

As used herein, the following terms have the following meanings unless expressly stated to the contrary.

The term "alkyl" refers to both straight- and branched-chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "lower alkoxy" refers to the group —$OR_a$ wherein $R_a$ is lower alkyl. Typical lower alkoxy groups include methoxy, ethoxy, and the like.

The term "polyalkyl" refers to alkyl groups which are generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene. Where given, average molecular weights refer to the average molecular weight of the polyalkyl substituent and not to the molecular weight of the entire compound.

The term "polyamine" as used herein refers to polyamines containing 2 to 12 amine nitrogen atoms and 2 to 40 carbon atoms and includes both acyclic and cyclic polyamines and may be substituted with a variety of substituents so long as the substitution does not significantly adversely affect the deposit control and fuel Compatibility properties of the present compositions.

The term "polyalkylene amine" by definition contains at least two amine groups; e.g., $NH_2$-alkylene-$NH_2$ The term "fuel" refers to liquid hydrocarbon compounds such as petroleum fuels or synthetic fuels which are useful as fuels in spark ignition or combustion fire engines and may also contain minor amounts of other auxiliary fuels.

The term "engine" refers to internal combustion engines and includes both spark ignition engines and combustion fired engines such as diesel engines.

The "average molecular weight" as used herein refers to number average molecular weight; Mn.

SYNTHESIS

The compounds of formula I can be conveniently prepared by the following schematically represented process:

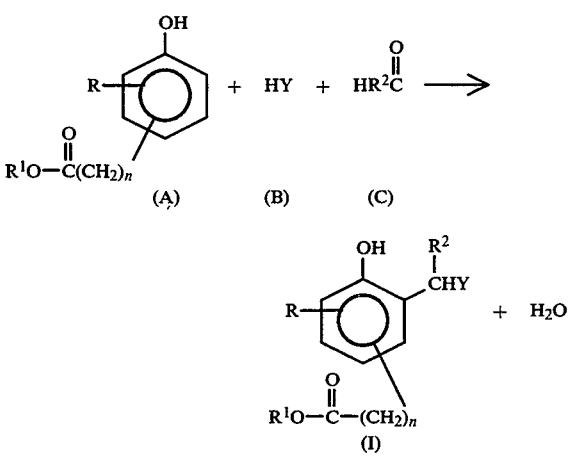

wherein R, $R^1$, $R^2$, Y and n are as defined hereinabove.

This process can be conducted by contacting reactants (A), (B) and (C) under reactive conditions optionally in an inert solvent or liquid reaction medium. Typically, the reaction is conducted at temperatures in the range of about from 25° C. to 200° C., preferably 75° C. to 150° C. for about from 1 to 50 hours, preferably 5 to 20 hours using mole ratios of reactant in the range of about from 0.1 to 10, preferably 0.3 to 3 moles of reactant (B) and 0.1 to 10, preferably 1 to 5 moles of aldehyde (C) per mole of A. Suitable inert organic solvents or liquid diluents (reaction medium) which can be used include, for example, toluene, xylene, chloroform, acetonitrile, and the like and compatible mixtures thereof. Again, although the reaction product is shown for convenience as formula (I) the condensation product will generally be a mixture of product reflecting competition and secondary reaction products; such as for example further reactions or cross-linking of amino nitrogens in the polyalkylene amine substituent.

Reactant (B) is the compound form corresponding to the radical Y and includes ammonia, lower alkyl amine (for example, methylamine, isopropylamine, hexylamine) and polyamines as defined hereinabove. The polyamine must contain at least one primary or secondary amino group because the reaction proceeds by displacement of one of the amino hydrogen groups. Suitable substituted and unsubstituted polyalkylene amines which can be used in the aforedescribed process include, for example, ethylene diamine, 1,2-propylene diamine, 1,3-propylene diamine, diethylene triamine, triethylene tetraamine, hexamethylene diamine, tetraethylene pentamine, dimethylaminopropylene diamine, N-(beta-aminoethyl)piperazine, N-(beta-aminoethyl) morpholine, N,N'-di(beta-aminoethyl)piperazine, N,N'-di(beta-aminoethyl)imidazolidone, N-(beta-cyanoethyl) ethane-1,2-diamine, 1-amino-3,6,9-triazaoctadecane, 1-amino-3,6-diaza-9-oxadecane, N-(beta-aminoethyl) diethanolamine, N'-acetylmethyl-N-(beta-aminoethyl) ethane-1,2-diamine, N-acetonyl-1,2-propanediamine, N-(beta-nitroethyl)-1,3-propane diamine, 1,3-dimethyl-5-(beta-aminoethyl)hexahydrotriazine, N-(beta-aminoethyl)hexahydrotriazine, 5-(beta-aminoethyl)-1,3,5-dioxazine, 2-(2-aminoethylamino)ethanol, and 2-[2-(2-aminoethylamino) ethylamino]ethanol, and the like. Again because the commercially produced polyalkylene amines are in many instances mixtures of polyalkylene amine, it is convenient to use the commercial mixture and correspondingly the product of formula I will also be a mixture.

The commercial polyalkylamines are typically mixtures in which one or several compounds predominate with the average composition indicated. For example, tetraethylene pentamine prepared by the polymerization of aziridine or the reaction of dichoroethylene and ammonia will have both lower and higher amine members, e.g., triethylene tetraamine, substituted piperazines and pentaethylene hexamine, but the composition will be mainly tetraethylene pentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product.

The above-described amines are generally known compounds and as noted above are in many cases commercial commodities and in any case can be prepared by known procedures or obvious modifications thereof, e.g., substitution of appropriate starting materials and optimization of reaction conditions.

Methods of preparation of amines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed, 1957; and Kirk-Othmer's "Encyclopedia of Chemical Technology", 2nd Ed., especially Volume 2, pp. 99–116.

The compounds of formula A can be prepared by the procedures described in my copending application Ser. No. 08/144,980 filed on Oct. 28, 1993. In accordance with the procedures described therein, the compounds of formula A may be prepared by esterifying a hydroxyaromatic carboxylic acid having the formula:

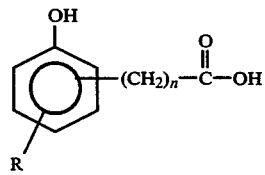

wherein R and n are as defined above, with a polyalkyl alcohol having the formula:

$$HO-R^1 \qquad (E)$$

wherein $R^1$ is as defined above, using conventional esterification reaction conditions.

The hydroxyaromatic carboxylic acids of formula D are either known compounds or can be prepared from known compounds by conventional procedures. Suitable hydroxyaromatic carboxylic acids for use as starting materials in this invention are 2-hydroxybenzoic acid, 3-hydroxybenzoic acid, 4-hydroxybenzoic acid, 3,4-dihydroxybenzoic acid, 3,4,5-trihydroxybenzoic acid, 3-hydroxy-4-methoxybenzoic acid, 4-hydroxy-3-methoxybenzoic acid, 3-t-butyl-4-hydroxybenzoic acid, 3,5-di-t-butyl-4-hydroxybenzoic acid, 4-hydroxyphenylacetic acid, 3-(4-hydroxyphenyl)propionic acid and the like.

The polyalkyl alcohols of formula E may also be prepared by conventional procedures known in the art. Such procedures are taught, for example, in U.S. Pat. No. 5,055,607 to Buckley and U.S. Pat. No. 4,859,210 to Franz et al., the disclosures of which are incorporated herein by reference.

In general, the polyalkyl substituent on the polyalkyl alcohols of formula E and the resulting polyalkyl hydroxyaromatic esters of the present invention will have a weight average molecular weight in the range of about 400 to 5000, preferably about 500 to 5000, more preferably about 500 to 3000, and most preferably about 600 to 2000.

The polyalkyl substituent on the polyalkyl alcohols employed in the invention may be generally derived from polyolefins which are polymers or copolymers of mono-olefins, particularly 1-mono-olefins, such as ethylene, propylene, butylene, and the like. Preferably, the mono-olefin employed will have 2 to about carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The preferred polyisobutenes used to prepare the presently employed polyalkyl alcohols are polyisobutenes which comprise at least about 20% of the more reactive methylvinylidene isomer, preferably at least 50% and more preferably at least 70%. Suitable polyisobutenes include those prepared using BF$_3$ catalysts. The preparation of such polyisobutenes in which the methylvinylidene isomer comprises a high percentage of the total composition is described in U.S. Pat. Nos. 4,152,499 and 4,605,808. Such polyisobutenes, known as "reactive" polyisobutenes, yield high molecular weight alcohols in which the hydroxyl group is at or near the end of the hydrocarbon chain.

Examples of suitable polyisobutenes having a high alkylvinylidene content include Ultravis 30, a polyisobutene having a molecular weight of about 1300 and a methylvinylidene content of about 74%, and Ultravis 10, a polyisobutene having a molecular weight of about 950 and a methylvinylidene content of about 76%, both available from British Petroleum.

The polyalkyl alcohols may be prepared from the corresponding olefins by conventional procedures. Such procedures include hydration of the double bond to give an alcohol. Suitable procedures for preparing such long-chain alcohols are described in I. T. Harrison and S. Harrison, *Compendium of Organic Synthetic Methods,* Wiley-Interscience, New York (1971), pp. 119–122, as well as in U.S. Pat. Nos. 5,055,607 and 4,859,210.

As indicated above, the polyalkyl hydroxyaromatic esters of formula A may be prepared by esterifying a hydroxyaromatic carboxylic acid of formula D with a polyalkyl alcohol of formula E under conventional esterification reaction conditions.

Typically, this reaction will be conducted by contacting a polyalkyl alcohol of formula E with about 0.25 to about 1.5 molar equivalents of a hydroxyaromatic carboxylic acid of formula D in the presence of an acidic catalyst at a temperature in the range of about 70° C. to about 160° C. for about 0.5 to about 48 hours. Suitable acid catalysts for this reaction include p-toluene sulfonic acid, methanesulfonic acid and the like. The reaction may be conducted in the presence or absence of an inert solvent, such as benzene, toluene and the like. The water generated by this reaction is preferably removed during the course of the reaction by, for example, azeotropic distillation with an inert solvent, such as toluene.

The polyalkyl hydroxyaromatic esters of formula A may also be synthesized by reacting a polyalkyl alcohol of formula E with an acyl halide having the formula:

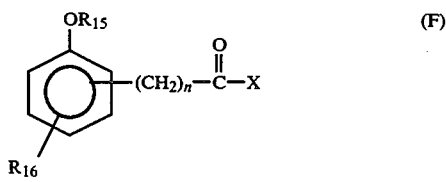
(F)

wherein X is a halide, such as chloride or bromide, and $R_{15}$ is a suitable hydroxyl protecting group, such as benzyl, tert-butyldimethylsilyl, methoxymethyl, and the like; R16 is independently hydrogen, lower alkyl, lower alkoxy, or the group $-OR_{18}$, wherein $R_{18}$ is a suitable hydroxyl protecting group; and n is as defined hereinabove.

Acyl halides of formula F may be prepared from the hydroxyaromatic carboxylic acids of formula D by first protecting the aromatic hydroxyl groups of formula D to form a carboxylic acid having the formula:

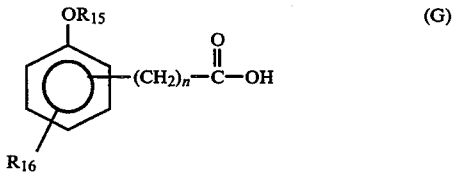
(G)

wherein $R_{15}$, $R_{16}$ and n are as defined above, and then converting the carboxylic acid moiety of formula G into an acyl halide using conventional procedures.

Protection of the aromatic hydroxyl groups of formula D may be accomplished using well known procedures. The choice of a suitable protecting group for a particular hydroxyaromatic carboxylic acid will be apparent to those skilled in the art. Various protecting groups, and their introduction and removal, are described, for example, in T. W. Greene and P. G. M. Wuts, *Protective Groups in Organic Synthesis,* Second Edition, Wiley, New York, 1991, and references cited therein. Alternatively, the protected derivatives of formula G can be prepared from known starting materials other than the hydroxyaromatic compounds of formula D by conventional procedures.

The carboxylic acid moiety of formula G may be converted into an acyl halide by contacting a compound of formula G with an inorganic acid halide, such as thionyl chloride, phosphorous trichloride, phosphorous tribromide, or phosphorous pentachloride; or alternatively, with oxalyl chloride. Generally, this reaction will be conducted using about 1 to 5 molar equivalents of the inorganic acid halide or oxalyl chloride, either neat or in an inert solvent, such as diethyl ether, at a temperature in the range of about 20° C. to about 80° C. for about 1 to about 48 hours. A catalyst, such as N,N-dimethylformamide, may also be used in this reaction.

In certain cases where the hydroxyaromatic carboxylic acids of formula D having bulky alkyl groups adjacent to the hydroxyl group, such as 3,5-di-t-butyl-4-hydroxybenzoic acid, it will generally not be necessary to protect the hydroxyl group prior to formation of the acyl halide, since such hydroxyl groups are sufficiently sterically hindered so as to be substantially non-reactive with the acyl halide moiety.

Reaction of an acyl halide of formula F with a polyalkyl alcohol of formula E provides an intermediate polyalkyl ester having the formula:

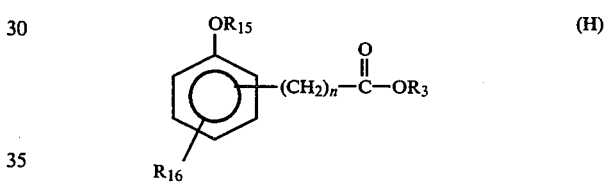
(H)

wherein $R_3$, $R_{15}$, $R_{16}$, and n are as defined above.

Typically, this reaction is conducted by contacting an alcohol of formula E with about 0.9 to about 1.5 molar equivalents of an acyl halide of formula F in an inert solvent, such as toluene, dichloromethane, diethyl ether, and the like, at a temperature in the range of about 25° C. to about 150° C. The reaction is generally complete in about 0.5 to about 48 hours. Preferably, the reaction is conducted in the presence of a sufficient amount of an amine capable of neutralizing the acid generated during the reaction, such as triethylamine, di(isopropyl)ethylamine, pyridine or 4-dimethylaminopyridine.

Deprotection of the aromatic hydroxyl group(s) on the esters of formula H then provides a polyalkyl hydroxyaromatic ester of formula A. Appropriate conditions for this deprotection step will depend upon the protecting group(s) utilized in the synthesis and will be readily apparent to those skilled in the art. For example, benzyl protecting groups may be removed by hydrogenolysis under 1 to about 4 atmospheres of hydrogen in the presence of a catalyst, such as palladium on carbon. Typically, this deprotection reaction is conducted in an inert solvent, preferably a mixture of ethyl acetate and acetic acid, at a temperature of from about 0° C. to about 40° C. for about 1 to about hours. It should be appreciated that where typical or preferred process conditions (e.g., reaction temperatures, times, mole ratios of reactions, solvents, pressures, etc.) are given, other process conditions may also be used unless otherwise stated. Optimum reaction conditions may vary with the particular reactants or solvents used, but such conditions can be determined by one skilled in the art by routine optimization procedures.

Moreover, those skilled in the art will recognize that it may be necessary to block or protect certain functional groups while conducting the following synthetic procedures. In such cases, the protecting group will serve to protect the functional group from undesired reactions or to block its undesired reaction with other functional groups or with the reagents used to carry out the desired chemical transformations. The proper choice of a protecting group for a particular functional group will be readily apparent to one skilled in the art. Various protecting groups and their introduction and removal are described, for example, in T. W. Greene and P. G. M. Wuts, *Protective Groups in Organic Synthesis,* Second Edition, Wiley, New York, 1991, and references cited therein.

In the present synthetic procedures, a hydroxyl group will preferably be protected, when necessary, as the benzyl or tert-butyldimethylsilyl ether. Introduction and removal of these protecting groups is well described in the art.

The products or product mixtures can be recovered from the respective reaction product mixtures by any suitable separation and purification procedure, such as, for example, extraction, evaporation, and recrystallization. Suitable separation and purification procedures for recovering product mixtures are, for example, illustrated in the Examples set forth hereinbelow.

FUEL COMPOSITIONS

The compounds of the present invention are useful as additives in hydrocarbon fuels to prevent and control engine deposits, particularly intake valve deposits. The proper concentration of additive necessary to achieve the desired deposit control varies depending upon the type of fuel employed, the type of engine, and the presence of other fuel additives.

In general, the concentration of the Mannich condensation products of this invention in hydrocarbon fuel will range from about 50 to about 2500 parts per million (ppm) by weight, preferably from 75 to 1000 ppm. When other deposit control additives are present, a lesser amount of the present additive may be used.

The Mannich condensation products of the present invention may be formulated as a concentrate using an inert stable oleophilic (i.e., dissolves in gasoline) organic solvent boiling in the range of about 150° F. to 400° F. (about 65° C. to 205° C.). Preferably, an aliphatic or an aromatic hydrocarbon solvent is used, such as benzene, toluene, xylene or higher-boiling aromatics or aromatic thinners. Aliphatic alcohols containing about 3 to 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 wt. %, preferably 10 to 50 wt. %, more preferably from 20 to 40 wt. %.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, or succinimides. Additionally, antioxidants, metal deactivators and demulsifiers may be present. The gasoline fuels may also contain amounts of other fuels such as, for example, methanol.

In diesel fuels, other well-known additives can be employed, such as pour point depressants, flow improvers, cetane improvers, and the like. The diesel fuels can also include other fuels such as, for example, methanol.

A fuel-soluble, nonvolatile carrier fluid or oil may also be used with the Mannich condensation products of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils, such as those described, for example, in U.S. Pat. No. 4,191,537 to Lewis, and polyesters, such as those described, for example, in U.S. Pat. Nos. 3,756,793 and 5,004,478 to Robinson and Vogel et al., respectively, and in European Patent Application Nos. 356,726 and 382,159, published Mar. 7, 1990 and Aug. 16, 1990, respectively.

These carrier fluids are believed to act as a carrier for the fuel additives of the present invention and to assist in removing and retarding deposits. The carrier fluid may also exhibit synergistic deposit control properties when used in combination with a Mannich condensation products of this invention.

The carrier fluids are typically employed in amounts ranging from about 100 to about 5000 ppm by weight of the hydrocarbon fuel, preferably from 400 to 3000 ppm of the fuel. Preferably, the ratio of carrier fluid to deposit control additive will range from about 0.5:1 to about 10:1, more preferably from 1:1 to 4:1, most preferably about 2:1.

When employed in a fuel concentrate, carrier fluids will generally be present in amounts ranging from about 20 to about 60 wt. %, preferably from 30 to 50 wt. %.

PREPARATIONS AND EXAMPLES

A further understanding of the invention can be had in the following nonlimiting Preparations and Examples. Wherein unless expressly stated to the contrary, all temperatures and temperature ranges refer to the Centigrade system and the term "ambient" or "room temperature" refers to about 20° C.–25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume. Where given, proton-magnetic resonance spectrum (p.m.r. or n.m.r.) were determined at 300 mHz, signals are assigned as singlets (s), broad singlets (bs), doublets (d), double doublets (dd), triplets (t), double triplets (dt), quartets (q), and multiplets (m), and cps refers to cycles per second.

PREPARATION 1

Preparation of Polyisobutyl 4-Hydroxybenzoate

To a flask equipped with a mechanical stirrer, thermometer, Dean Stark trap, reflux condensor and nitrogen inlet was added 525 grams of polyisobutanol (average molecular weight 984, prepared via hydroformylation of polyisobutene sold under the trademark Amoco H-100), 124.7 grams of 4-hydroxybenzoic acid, and 13.0 grams of p-toluenesulfonic acid. The mixture was stirred at 130° C. for 16 hours, cooled to room temperature and diluted with 2 liters of diethyl ether. The organic phase was washed two times with saturated aqueous sodium bicarbonate, once with brine, dried over anhydrous magnesium sulfate, filtered and concentrated in vacuo to yield 514.3 grams of the desired product as a yellow oil. IR (neat) 1715, 1685 cm$^{-1}$; $^1$H NMR (CDCl$_3$) δ 7.95 (d, 2H), 6.9 (d, 2H), 5.8 (bs, 1H), 4.3 (t, 2H), 0.6–1.8 (m, 137H).

Similarly, by applying the above-described procedure using the appropriate average molecular weight polyalkyl alcohol and substituted 4-hydroxybenzoic acid, the following compounds can be prepared:
Polypropyl (Mn 400) 4-Hydroxybenzoate
Polyisobutyl (Mn 2100) 3,4-Dihydroxybenzoate
Polydecyl (Mn 3500) 4-Hydroxybenzoate
Polyoctyl (Mn 4500) 4-Hydroxybenzoate

PREPARATION 2

Preparation of Polyisobutyl 4-Hydroxyphenylacetate

To a flask equipped with a mechanical stirrer, thermometer, Dean Stark trap, reflux condensor and nitrogen inlet was added 35.0 grams of polyisobutanol (average molecular weight 984, prepared via hydroformylation of polyisobutene, sold under the trademark Amoco H-100), 9.16 grams of 4-hydroxyphenylacetic acid, and 0.86 grams of p-toluene sulfonic acid. The mixture was stirred at 130° C. for 16 hours, cooled to room temperature and diluted with 500 milliliters of diethyl ether. The organic phase was washed three times with methanol/water (4:1), once with brine, dried over anhydrous magnesium sulfate, filtered and concentrated in vacuo to yield 45.8 grams of a brown oil. The oil was chromatographed on silica gel eluting with hexane/ethyl acetate/ethanol (8:1.8:0.2) to yield 26.6 grams of the desired product as a yellow oil. IR (neat) 1714 cm$^{-1}$; $^1$H NMR (CDCl$_3$) δ 7.15 (d, 2H), 6.75 (d, 2H), 5.05 (bs, 1H), 4.1 (t, 2H), 3.5 (s, 2H), 0.6–1.8 (m, 137H).

PREPARATION 3

Preparation of Polyisobutyl Salicylate

To a flask equipped with a mechanical stirrer, thermometer, Dean Stark trap, reflux condensor and nitrogen inlet was added 35.0 grams of polyisobutanol (molecular weight average 984, prepared via hydroformylation of polyisobutene, sold under the trademark Amoco H-100), 8.3 grams of salicylic acid, and 0.86 grams of p-toluene sulfonic acid. The mixture was stirred at 130° C. for 16 hours, cooled to room temperature and diluted with 500 milliliters of diethyl ether. The organic phase was washed three times with methanol/water (4:1), once with brine, dried over anhydrous magnesium sulfate, filtered and concentrated in vacuo to yield 43.3 grams of a yellow oil. The oil was chromatographed on silica gel eluting with hexane/ethyl acetate/ethanol (8:1.8:0.2) to yield 26.4 grams of the desired product as a yellow oil. IR (neat) 1682 cm$^1$; $^1$H NMR (CDCl$_3$) δ 10.8 (s, 1H), 7.8 (d, 1H), 7.4 (t, 1H), 7.0 (d, 1H), 6.8 (t, 1H), 4.3 (t, 2H), 0.6–1.8 (m, 137H).

PREPARATION 4a

Preparation of 4-Benzyloxy-2,6-dimethylbenzoyl Chloride

To a flask equipped with a magnetic stirrer and nitrogen inlet was added 11.35 grams of 4-benzyloxy-2,6-dimethylbenzoic acid (prepared as described by S. Thea, G. Cevasco, G. Guanti, No. Kashefi-Naini and A. Williams, *J. Org. Chem.*, 50, 1867 (1985)), 120 mL of anhydrous methylene chloride, followed by 9.7 mL of oxalyl chloride. The resulting mixture was stirred at room temperature for 16 hours and then the solvent was removed in vacuo to yield 11.4 grams of the desired acid chloride.

PREPARATION 4b

Preparation of Polyisobutyl 4-Benzyloxy-2,6-dimethylbenzoate

4-Benzyloxy-2,6-dimethylbenzoyl chloride (5.3 grams) from Example 4 was combined with 13.5 grams of polyisobutanol (average molecular weight 984, prepared via hydroformylation of Amoco H-100 polyisobutene) and 200 mL of anhydrous toluene. Triethylamine (2.8 mL) and 4-dimethylaminopyridine (1.18 grams) were then added and the resulting mixture was heated to reflux under nitrogen for 16 hours. The reaction was cooled to room temperature and diluted with diethyl ether. The organic layer was washed twice with 1% aqueous hydrochloric acid, twice with saturated aqueous sodium bicarbonate solution, and once with brine. The organic layer was then dried over anhydrous magnesium sulfate, filtered and the solvents removed in vacuo to yield 17.8 grams of a brown oil. The oil was chromatographed on silica gel, eluting with hexane/ethyl acetate/ethanol (9:0.8:0.2), to yield 16.8 grams of the desired product as a brown oil.

PREPARATION 4c

Preparation of Polyisobutyl 4-Hydroxy-2,6-dimethylbenzoate

A solution of 16.8 grams of the product from Example 5 in 100 mL of ethylacetate and 100 mL of acetic acid containing 3.0 grams of 10% palladium on charcoal was hydrogenolyzed at 35–40 psi for 16 hours on a Parr low-pressure hydrogenator. Catalyst filtration and removal of residual acetic acid with toluene in vacuo yielded 13.6 grams of the desired product as a yellow oil. IR (neat) 1729, 1696 cm$^{-1}$; $^1$H NMR (CDCl$_3$) δ 6.5 (s, 2H), 5.0 (bs, 1H), 4.3 (t, 2H), 2.3 (s, 6H), 0.6–1.8 (m, 137H).

PREPARATION 5

Preparation of 4-Benzyloxybenzoyl Chloride

To a flash equipped with a magnetic stirrer and drying tube was added 75.0 grams of 4-benzyloxybenzoic acid and 700 mL of anhydrous methylene chloride and then 72 mL of oxalyl chloride. The resulting mixture was stirred at room temperature for 16 hours and then the solvent was removed in vacuo to yield 79.6 grams of the desired acid chloride.

PREPARATION 6

Preparation of Polyisobutyl 3-Hydroxybenzoate

To a flask equipped with a mechanical stirrer, thermometer, Dean Stark trap, reflux condensor and nitrogen inlet was added 350 grams of polyisobutanol (molecular weight average 984, prepared via hydroformylation of Amoco H-100 polyisobutene), 83.1 grams of 3-hydroxybenzoic acid and 8.6 grams of p-toluene sulfonic acid. The mixture was stirred at 130° C. for 16 hours, cooled to room temperature and diluted with 2 liters of hexane. The organic phase was washed two times with saturated aqueous sodium bicarbonate, once with brine, dried over anhydrous magnesium sulfate, filtered and concentrated in vacuo to yield 292 grams of the title product as a yellow oil. IR (neat) 1722, 1701 cm$^{-1}$; $^1$H NMR (CDCl$_3$) δ 7.55 (d, 1H), 7.5 (s,1H), 7.3 (dd, 1H), 7.1 (d, 1H), 5.45 (bs, 1H), 4.3 (t, 2H), 0.6–1.8 (m, 137H).

EXAMPLE 1

Mannich Condensation Product of Polyisobutyl 4-Hydroxybenzoate and Diethylene Triamine To a flask equipped with a magnetic stirrer, thermometer, reflux condensor and nitrogen inlet was added polyisobutyl-4-hydroxybenzoate (20.0 grams) from Preparation 1 and diethylenetriamine (1.9 mL). The mixture was heated to 90° C. and formaldehyde (3.9 mL of a 37 wt. % solution in water) was added. The reaction was heated for 16 hours at 90° C. and the temperature was then raised to 135° C. The reaction was maintained at 135° C. for 2 hours while sweeping out the water with a stream of nitrogen. The reaction was cooled to room temperature and yielded 23.0 grams of a brown-red oil. The oil was chromatographed on silica gel, eluting with hexane/diethyl ether (1:1) followed by hexane/diethyl ether/methanol/isopropylamine (4:4:1.5:0.5) to yield 7.3 grams of the title product as a brown-red oil. IR (neat) 1714, 1680 cm$^{-1}$; $^1$H NMR (CDCl$_3$D$_2$O) δ 7.6–7.95 (m, 2H), 6.7–6.9, (m, 1H), 4.3 (t, 2H), 2.15–4.1 (m, 10H), 0.6–1.6 (m, 137H).

Similarly, by applying the above procedure using the corresponding products of Preparations 2, 3 and 4c as reactants, the corresponding Mannich condensation products thereof can be prepared; i.e.:

Mannich condensation product of polypropyl (Mn 400) 4-hydroxybenzoate and diethylene triamine;
Mannich condensation product of polydecyl (MN 3500) 4-hydroxybenzoate and diethyl triamine;
Mannich condensation product of polyoctyl (Mn 4500) 4-hydroxybenzoate and diethyl triamine;
Mannich condensation product of polysobutyl (Mn 2100) 3,4-dihydroxybenzoate and diethyl triamine;
Mannich condensation product of polyisobutyl (Mn 984) 4-hydroxyphenylacetate and diethyl triamine;
Mannich condensation product of polyisobutyl (Mn 984) salicylate and diethyl triamine; and
Mannich condensation product of polyisobutyl (Mn 984) 2,6-dimethylbenzoate and diethyl triamine.

Similarly, by respectively replacing formaldehyde with acetaldehyde; isobutyraldehyde and valeraldehyde, the corresponding R$^2$ (formula I) is methyl, isopropyl, and n-butyl homologs of the above Mannich condensation products can be prepared.

EXAMPLE 2

Mannich Condensation Product of Polyisobutyl 3-Hydroxybenzoate and Diethylene Triamine To a flask equipped with a magnetic stirrer, thermometer, reflux condensor and nitrogen inlet was added polyisobutyl-3-hydroxybenzoate (285.8 grams) from Preparation 6 and diethylenetriamine (27.9 mL). The mixture was heated to 90° C. and formaldehyde (57.7 mL of a 37 wt. % solution in water) was added. The reaction was heated for 16 hours at 90° C. and the temperature was then raised to 135° C. The reaction was maintained at 135° C. for 2 hours while sweeping out the water with a stream of nitrogen. The reaction was cooled to room temperature and yielded 327.3 grams of a brown-red oil. The oil was chromatographed on silica gel, eluting with hexane/diethyl ether (1:1) followed by hexane/diethyl ether/methanol/isopropylamine 4:4:1.5:0.5) to yield 67 grams of the title product as a brown-red oil. IR (neat) 1722, 1676 cm$^{-1}$; $^1$H NMR (CDCl$_3$D$_2$O) δ 7.45–7.55 (m, 2H), 7.0–7.15, (m, 1H), 4.3 (t, 2H), 2.2–4.2 (10H), 0.6–1.8 (m, 137H).

Similarly, by applying the above procedure using the corresponding products of Preparation 6 and appropriate polyamines as reactants, the following compounds can be prepared:

Mannich condensation product of polyisobutyl (Mn 500) 3-hydroxybenzoate and ethylene diamine;
Mannich condensation product of polypropyl (Mn 1400) 3-hydroxybenzoate and diethylene triamine;
Mannich condensation product of polypropyl (Mn 2400) 3-hydroxybenzoate and ethylene diamine;

EXAMPLE 3

Single-Cylinder Engine Test

The test compounds were blended in gasoline and their deposit reducing capacity determined in an ASTM/CFR single-cylinder engine test.

A Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 40° BTC; engine speed is 1800 rpm; the crankcase oil is a commercial 30W oil.

The amount of carbonaceous deposit in milligrams on the intake valves is reported for each of the test compounds in Table I. (Reference to a compound by Example No refers to the title composition for that Example.)

TABLE I

| Sample[1] | Intake Valve Deposit Weight (in milligrams) | | |
|---|---|---|---|
| | Run 1 | Run 2 | Average |
| Base Fuel | 302.6 | 300.4 | 301.5 |
| Preparation 11 | 65.0 | 60.0 | 62.5 |
| Example 1 | 12.2 | 3.0 | 7.6 |

[1]At 200 parts per million actives (ppma).

TABLE II

| Sample[1] | Intake Valve Deposit Weight (in milligrams) | | |
|---|---|---|---|
| | Run 1 | Run 2 | Average |
| Base Fuel | 181.9 | 181.3 | 181.6 |
| Preparation 12 | 119.0 | 102.2 | 110.6 |
| Example 2 | 18.8 | 14.0 | 16.4 |

[1]At 150 parts per million actives (ppma).

The base fuel employed in the above single-cylinder engine tests was a regular octane unleaded gasoline containing no fuel detergent. The test compounds were admixed with the base fuel to give a concentration of 200 ppma (parts per million actives) or 150 ppma.

The data in Tables I and II illustrates the outstanding reduction in intake valve deposits provided by the Mannich condensation product of the present fuel additive composition compared to the base fuel and also as compared to reactant A which itself produced a very good reduction in intake valve deposits.

Obviously, many modifications and variations of the invention described hereinabove and below can be made without departing from the essence and scope thereof.

What is claimed is:

1. A composition prepared by the Mannich condensation of a compound having the formula

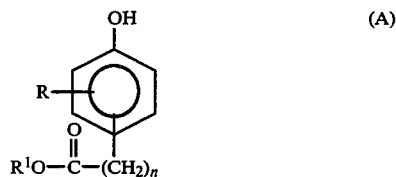 (A)

wherein

R is hydrogen, lower alkyl having 1 through 6 carbon atoms, hydroxy or lower alkoxy having 1 through 6 carbon atoms;

$R^1$ is polyalkyl having an average molecular weight of about from 400 to 5000 and n is 0 or a whole integer of from 1 through 10;

with formaldehyde or an alkylaldehyde having 1 through 6 carbon atoms and a nitrogen base selected from ammonia, lower alkylamine having 1 through 6 carbon atoms, a polyamine having 2 through 40 carbon atoms and 2 through 12 amine nitrogen atoms and mixtures thereof.

2. The composition according to claim 1, wherein R is hydrogen, hydroxy, or lower alkyl having 1 to 4 carbon atoms and said nitrogen base is a polyalkylene amine.

3. The composition according to claim 2, wherein R is hydrogen or hydroxy.

4. The composition according to claim 1, wherein n is 0, 1 or 2.

5. The composition according to claim 4, wherein R is hydrogen, and n is 0.

6. The composition according to claim 1, wherein $R^1$ is a polyalkyl group having an average molecular weight in the range of about 500 to 3000.

7. The composition according to claim 6, wherein $R^1$ has an average molecular weight in the range of about 600 to 2000.

8. The composition according to claim 1, wherein $R^1$ is a polyalkyl group derived from polypropylene, polybutene, or polyalphaolefin oligomers of 1-octene or 1-decene.

9. The composition according to claim 8, wherein $R^1$ is derived from polyisobutene.

10. The composition according to claim 9, wherein the polyisobutene contains at least about 20% of a methylvinylidene isomer.

11. The composition according to claim 1, wherein R is hydrogen, hydroxy, or lower alkyl having 1 to 4 carbon atoms and said nitrogen base is selected from polyethylene polyamines and polypropylene polyamines.

12. The composition according to claim 11, wherein R is hydrogen or hydroxy and said nitrogen base is ethylene diamine or diethylene triamine.

13. The composition according to claim 12, wherein n is 0, 1 or 2.

14. The composition according to claim 13, wherein R is hydrogen, and n is 0.

15. The composition according to claim 11, wherein $R^1$ is a polyalkyl group having an average molecular weight in the range of about 500 to 3000.

16. The composition according to claim 15, wherein $R^1$ has an average molecular weight in the range of about 600 to 2000 and $R^2$ is hydrogen.

17. The composition according to claim 11, wherein $R^1$ is a polyalkyl group derived from polypropylene, polybutene, or polyalphaolefin oligomers of 1-octene or 1-decene.

18. The composition according to claim 17, wherein $R^1$ is derived from polyisobutene.

19. The composition according to claim 18, wherein said polyisobutene contains at least about 20% of a methylvinylidene isomer and has an average molecular weight in the range of about 500 to 3000.

20. The composition according to claim 1, wherein said nitrogen base polyamine is ethylene diamine or diethylene triamine.

21. The composition of claim 1, wherein said nitrogen base is ammonia or lower alkylamine.

22. The composition of claim 1 wherein said Mannich condensation is conducted at temperatures in the range of about from 75° to 150° C. using mole ratios of from 0.3 to 3 moles of said alkylaldehyde at 0.3 to 3 moles of said polyamine per mole of compound of formula A.

23. A compound of the formula:

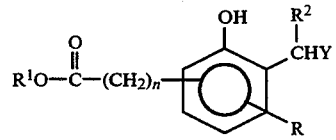

and a fuel-soluble salt thereof; wherein wherein

R is hydrogen, lower alkyl having 1 through 6 carbon atoms, hydroxy or lower alkoxy having 1 through 6 carbon atoms;

$R^1$ is a polyalkyl group having an average molecular weight in the range of about from 400 to 5000;

n is 0 or a whole integer of from 1 through 10;

$R^2$ is hydrogen or lower alkyl having 1 through 6 carbon atoms;

Y is amino, lower alkylamino having 1 through 6 carbon atoms or a polyamine radical having 2 through 40 carbon atoms and 2 through 12 amine nitrogen atoms with the proviso that the attachment of Y to the

linking group is via one of its amine nitrogen atoms and the further proviso that the the

substituent is ortho to a hydroxy substituent on the benzene ring and the remaining substituents may be at any available position on the benzene ring.

24. The compound according to claim 23, wherein R is hydrogen, hydroxy, or lower alkyl having 1 to 4 carbon atoms and Y is a polyalkylene amine.

25. The compound according to claim 24, wherein R is hydrogen or hydroxy.

26. The compound according to claim 23, wherein n is 0, 1 or 2.

27. The compound according to claim 26, wherein R is hydrogen, and n is 0.

28. The compound according to claim 23, wherein $R^1$ is a polyalkyl group having an average molecular weight in the range of about 500 to 3000.

29. The compound according to claim 28, wherein $R^1$ has an average molecular weight in the range of about 600 to 2000.

30. The compound according to claim 23, wherein $R^1$ is a polyalkyl group derived from polypropylene, polybutene, or polyalphaolefin oligomers of 1-octene or 1-decene.

31. The compound according to claim 32, wherein $R^1$ is derived from polyisobutene.

32. The compound according to claim 31, wherein the polyisobutene contains at least about 20% of a methylvinylidene isomer.

33. The compound according to claim 23, wherein R is hydrogen, hydroxy,I or lower alkyl having 1 to 4 carbon atoms and Y is a polyalkylene amine radical selected from polyethylene polyamine radical and polypropylene polyamine radicals.

34. The compound according to claim 33, wherein R is hydrogen or hydroxy and $R^2$ is hydrogen and Y is an ethylene diamine radical or diethylene triamine radical.

35. The compound according to claim 34, wherein n is 0, 1 or 2.

36. The compound according to claim 35, wherein R is hydrogen, and n is 0.

37. The compound according to claim 33, wherein $R^1$ is a polyalkyl group having an average molecular weight in the range of about 400 to 5000.

38. The compound according to claim 37, wherein $R^1$ has an average molecular weight in the range of about 500 to 3000 and $R^2$ is hydrogen.

39. The compound according to claim 33, wherein $R^1$ is a polyalkyl group derived from polypropylene, polybutene, or polyalphaolefin oligomers of 1-octene or 1-decene.

40. The compound according to claim 39, wherein $R^1$ is derived from polyisobutene and has an average molecular weight of about from 600 to 2000.

41. The compound according to claim 40, wherein said polyisobutene contains at least about 20% of a methylvinylidene isomer and $R^2$ is hydrogen.

42. The compound according to claim 23 wherein Y is —NHCH$_2$CH$_2$NH$_2$ or —NHCH$_2$CH$_2$NHCH$_2$CH$_2$NH$_2$.

43. The compound according to claim 23, wherein R is hydrogen, hydroxy, or lower alkyl having 1 to 4 carbon atoms and Y is amino or lower alkylamino.

44. The compound according to claim 43, wherein R is hydrogen or hydroxy and n is 0, 1 or 2.

45. The compound according to claim 44, wherein R is hydrogen, and n is 0 and wherein $R^1$ is a polyalkyl group having an average molecular weight in the range of about 500 to 3000.

46. The compound according to claim 45, wherein $R^1$ is a polyalkyl group derived from polypropylene, polybutene, or polyalphaolefin oligomers of 1-octene or 1-decene.

47. The compound according to claim 46, wherein $R^1$ is derived from polyisobutene and wherein said polyisobutene contains at least about 20% of a methylvinylidene isomer and $R^2$ is hydrogen.

48. A fuel mixture comprising a major amount of hydrocarbons boiling in the gasoline or diesel oil range and an amount effective to reduce intake valve deposits of a fuel additive selected from the group consisting of a composition prepared by the Mannich condensation of a compound having the formula

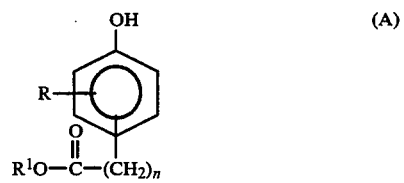

wherein
R is hydrogen, lower alkyl having 1 through 6 carbon atoms, hydroxy or lower alkoxy having 1 through 6 carbon atoms;
$R^1$ is polyalkyl having an average molecular weight of about from 400 to 5000 and n is 0 or a whole integer of from 1 through 10;
with formaldehyde or an alkylaldehyde having 1 through 6 carbon atoms and a nitrogen base selected from ammonia, lower alkylamine having 1 through 6 carbon atoms, a polyamine having 2 through 40 carbon atoms and 2 through 12 amine nitrogen atoms; fuel soluble salts of said composition; and mixtures thereof.

49. The fuel mixture of claim 48 wherein R is hydrogen, hydroxy, or lower alkyl having 1 to 4 carbon atoms and said nitrogen base is a polyalkylene amine.

50. The fuel mixture of claim 48 wherein R is hydrogen and n is 0.

51. The fuel mixture of claim 48 wherein $R^1$ is a polyalkyl group having an average molecular weight in the range of about 500 to 3000.

52. The fuel mixture of claim 48 wherein $R^1$ is a polyalkyl group derived from polyisobutene.

53. The fuel mixture of claim 48 wherein R is hydrogen or hydroxy and said nitrogen base is ethylene diamine or diethylene triamine.

54. The fuel mixture of claim 48 wherein said nitrogen base is ammonia, lower alkylamine having 1 through 6 carbon atoms, ethylene diamine or diethylene triamine.

55. The fuel mixture of claim 48 wherein said Mannich condensation is conducted at temperatures in the range of about from 75° C. to 150° C. using mole ratios of from 0.3 to 3 moles of said formaldehyde or alkylaldehyde per mole of compound (A).

56. A fuel mixture comprising a major amount of hydrocarbons boiling in the gasoline or diesel oil range and an amount effective to reduce intake valve deposits of a fuel additive selected from the group consisting of a compound of the formula

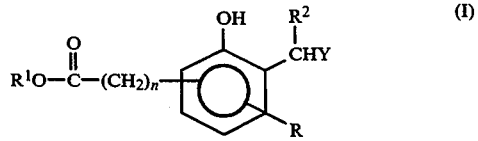

wherein

R is hydrogen, lower alkyl having 1 through 6 carbon atoms, hydroxy or lower alkoxy having 1 through 6 carbon atoms;

$R^1$ is a polyalkyl group having an average molecular weight in the range of about from 400 to 5000;

n is 0 or a whole integer of from 1 through 10;

$R^2$ is hydrogen or lower alkyl having 1 through 6 carbon atoms;

Y is amino, lower alkylamino having 1 through 6 carbon atoms or a polyamine radical having 2 through 40 carbon atoms and 2 through 12 amine nitrogen atoms with the proviso that the attachment of Y to the

linking group is via one of its amine nitrogen atoms and the further proviso that the —CH($R^2$)Y substituent is ortho to a hydroxy substituent on the benzene ring and the remaining substituents may be at any available position on the benzene ring;

fuel soluble salts of the compound of formula (I); and mixtures thereof.

57. The fuel mixture of claim 56 wherein R is hydrogen, hydroxy, or alkyl having 1 to 4 carbon atoms and Y is polyalkylene amine.

58. The fuel mixture of claim 57 wherein R is hydrogen or hydroxy.

59. The fuel mixture of claim 56 wherein n is 0, 1 or 2.

60. The fuel mixture of claim 56 wherein R is hydrogen, hydroxy, or lower alkyl having 1 to 4 carbon atoms and Y is amino or lower alkylamines.

61. A fuel concentrate comprising an inert stable oleophilic organic solvent boiling in the range of about from 65° C. to 210° C. and from 10 to 70 wt. % of a fuel additive selected from the group consisting of a composition prepared by the Mannich condensation of a compound having the formula

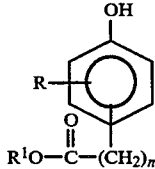

(A)

wherein

R is hydrogen, lower alkyl having 1 through 6 carbon atoms, hydroxy or lower alkoxy having 1 through 6 carbon atoms;

$R^1$ is polyalkyl having an average molecular weight of about from 400 to 5000 and n is 0 or a whole integer of from 1 through 10;

with formaldehyde or an alkylaldehyde having 1 through 6 carbon atoms and a nitrogen base selected from ammonia, lower alkylamine having 1 through 6 carbon atoms, a polyamine having 2 through 40 carbon atoms and 2 through 12 amine nitrogen atoms;

fuel soluble salts of said composition; and mixtures thereof.

62. The fuel concentrate of claim 61 wherein R is hydrogen, hydroxy, or lower alkyl having 1 to 4 carbon atoms and said nitrogen base is a polyalkylene amine.

63. The fuel concentrate of claim 61 wherein R is hydrogen and n is 0.

64. The fuel concentrate of claim 61 wherein R is hydrogen, hydroxy, or lower alkyl having 1 to 4 carbon atoms and said nitrogen base is selected from polyethylene polyamines and polypropylene polyamines.

65. The fuel concentrate of claim 61 where $R^1$ is derived from polyisobutene containing at least about 20% of a methylvinylidene isomer and has an average molecular weight in the range of about 500 to 3000.

66. A fuel concentrate comprising an inert stable oleophilic organic solvent boiling in the range of from about 65° C. to 210° C. and from about 10 to about 70 wt. % of a fuel additive selected from the group consisting of a compound of the formula

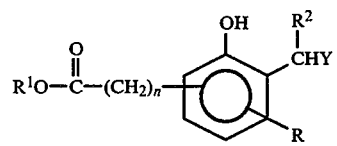

(I)

wherein

R is hydrogen, lower alkyl having 1 through 6 carbon atoms, hydroxy or lower alkoxy having 1 through 6 carbon atoms;

$R^1$ is a polyalkyl group having an average molecular weight in the range of about from 400 to 5000;

n is 0 or a whole integer of from 1 through 10;

$R^2$ is hydrogen or lower alkyl having 1 through 6 carbon atoms;

Y is amino, lower alkylamino having 1 through 6 carbon atoms or a polyamine radical having 2 through 40 carbon atoms and 2 through 12 amine nitrogen atoms with the proviso that the attachment of Y to the

linking group is via one of its amine nitrogen atoms and the further proviso that the —CH($R^2$)Y substituent is ortho to a hydroxy substituent on the benzene ring and the remaining substituents may be at any available position on the benzene ring;

fuel soluble salts of the compound of formula (I); and mixtures thereof.

67. The fuel concentrate of claim 66 wherein R is hydrogen, hydroxy, or lower alkyl having 1 to 4 carbon atoms and Y is a polyalkylene amine.

68. The fuel concentrate of claim 66 wherein $R^1$ is a polyalkyl group derived from polyisobutene.

69. The fuel concentrate of claim 66 wherein R is hydrogen or hydroxy, $R^2$ is hydrogen, Y is an ethylene diamine radical or diethylene triamine radical and n is 0, 1, or 2.

70. The fuel concentrate of claim 66 wherein R is hydrogen, hydroxy, or lower alkyl having 1 to 4 carbon atoms, Y is a polyalkylene amine radical and selected from polyethylene polyamine radicals and polypropylene polyamine radicals and $R^1$ is a polyalkyl group having an average molecular weight in the range of about 400 to 3000.

71. The fuel concentrate of claim 66 wherein R is hydrogen, hydroxy, or lower alkyl having 1 to 4 carbon atoms, Y is a polyalkylene amine radicals selected from polyethylene polyamine radicals and polypropylene polyamine radicals and $R^1$ is a polyalkyl derived from polyisobutene and has an average molecular weight of about 600 to 2000.

72. The fuel concentrate of claim 66 wherein Y is —NHCH$_2$CH$_2$NH$_2$ or —NHCH$_2$CH$_2$NHCH$_2$CH$_2$NH$_2$.

* * * * *